(12) United States Patent
Shirakawa et al.

(10) Patent No.: US 12,347,091 B2
(45) Date of Patent: Jul. 1, 2025

(54) TEACHER DATA GENERATING METHOD AND GENERATING DEVICE

(71) Applicant: HONDA MOTOR CO., LTD., Tokyo (JP)

(72) Inventors: Seiya Shirakawa, Tokyo (JP); Kosuke Jojima, Tokyo (JP); Toshikazu Karube, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 341 days.

(21) Appl. No.: 18/188,615

(22) Filed: Mar. 23, 2023

(65) Prior Publication Data

US 2023/0316492 A1 Oct. 5, 2023

(30) Foreign Application Priority Data

Mar. 31, 2022 (JP) ................................ 2022-058348

(51) Int. Cl.
*G06T 7/00* (2017.01)
(52) U.S. Cl.
CPC .. *G06T 7/0004* (2013.01); *G06T 2207/20081* (2013.01); *G06T 2207/20084* (2013.01)
(58) Field of Classification Search
CPC ......... G06T 7/0004; G06T 2207/20081; G06T 2207/20084; G06T 2207/10024; G06T 7/90; G06T 2207/30108; G06N 20/00
See application file for complete search history.

(56) References Cited

U.S. PATENT DOCUMENTS

| 2021/0019878 A1* | 1/2021 | Iizawa | G06V 20/00 |
| 2022/0284567 A1* | 9/2022 | Ohya | G06T 7/0004 |
| 2023/0162344 A1* | 5/2023 | Zhao | G06V 10/82 382/141 |

FOREIGN PATENT DOCUMENTS

JP 2020-060879 A 4/2020

* cited by examiner

*Primary Examiner* — Bobbak Safaipour
(74) *Attorney, Agent, or Firm* — Carter, DeLuca & Farrell LLP

(57) ABSTRACT

A teacher data generating method includes: causing a generation model to perform learning by using a learning image in which boundary information indicating in a chromatic color a range of a defect is superimposed on a defective product image in a gray scale so as to generate a generated defect image including a new image of a defect in the gray scale and an image of the boundary information in the chromatic color; generating the generated defect image by using the generation model; extracting a pixel having a pixel value corresponding to the chromatic color from the generated defect image, extracting the boundary information corresponding to the generated defect image, and acquiring a gray scale defect image without including an image of the boundary information; calculating a coordinate of the boundary information; and associating the gray scale defect image with the coordinate to obtain defective product teacher data.

3 Claims, 5 Drawing Sheets

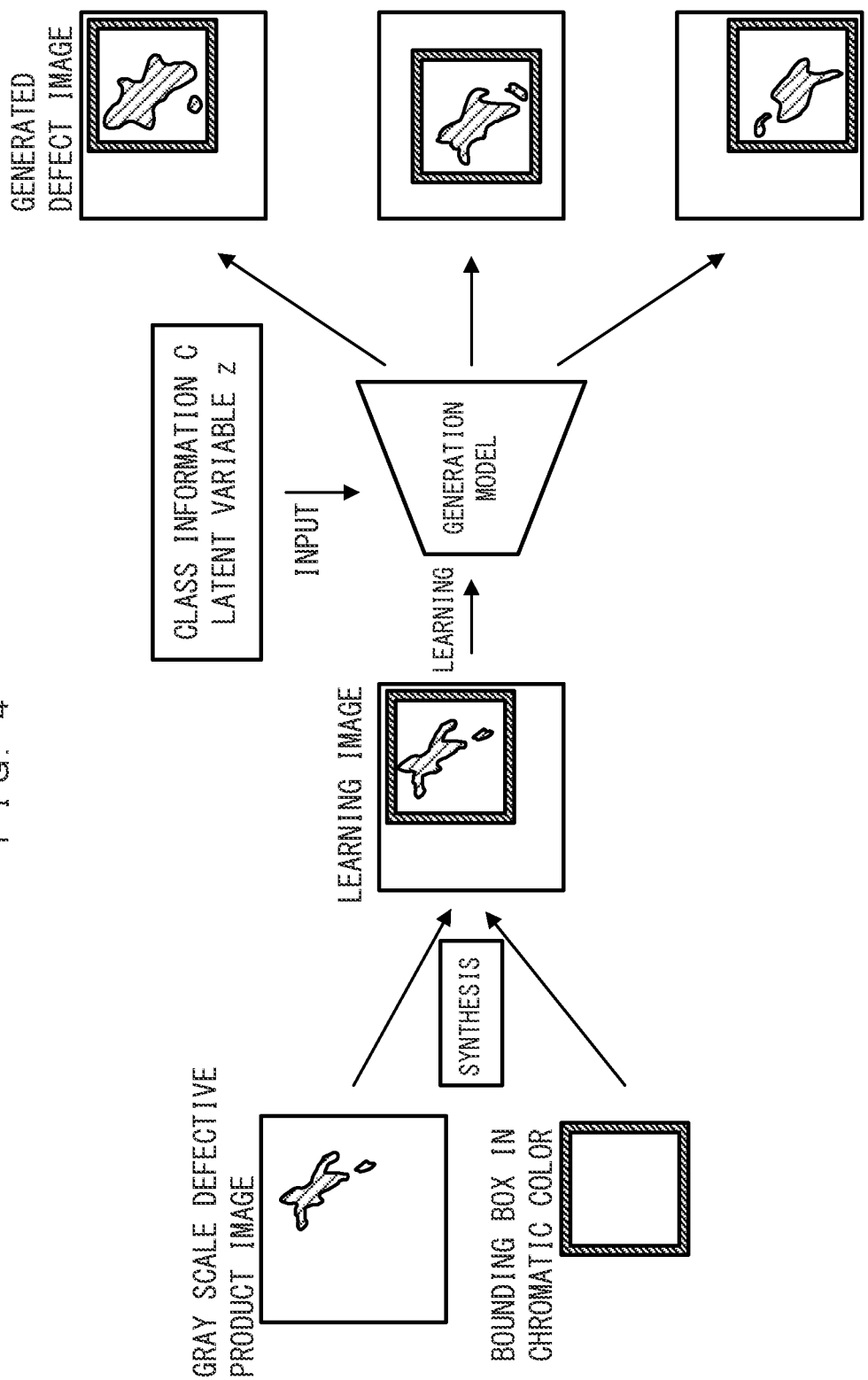
F I G. 4

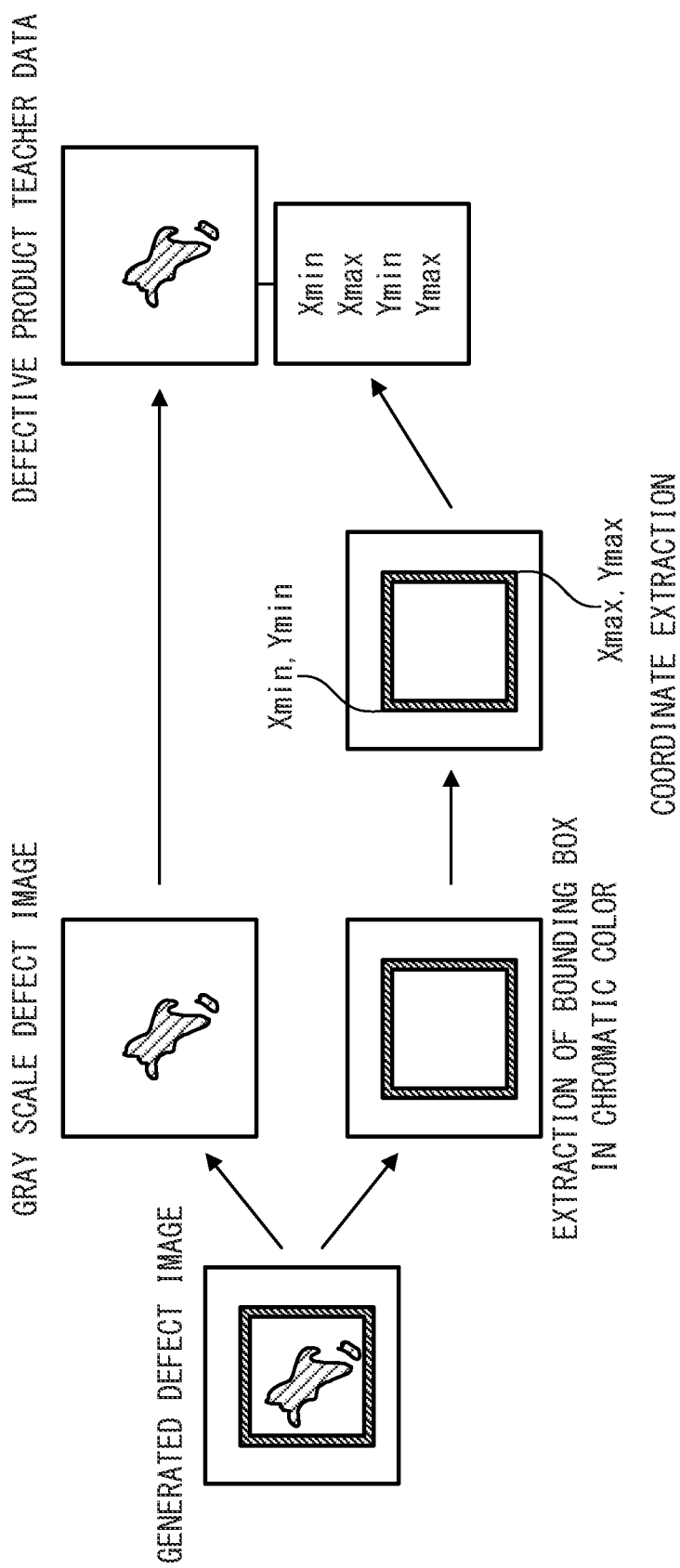

TEACHER DATA GENERATING METHOD AND GENERATING DEVICE

BACKGROUND

Technical Field

The present invention relates to teacher data generating method and generating device, in a learning model to be applied to an inspection device or the like having a machine learning function that uses a neural network, and to determine the quality of an inspected object.

Related Art

In recent years, with an inspection device having a machine learning function that uses a neural network, progress has been made on the development of automation technology in an inspection operation for determining whether inspected objects such as various types of industrial products or parts are each a normal product (non-defective product) or an abnormal product (defective product). In such an inspection device, learning is performed by reading, as teacher data, many pieces of image data of appearances of inspected objects that have been classified as the non-defective products or the defective products. Then, the inspection device that has learned classification criteria becomes capable of classifying a new inspected object that has been imaged by a camera as a non-defective product or a defective product.

As described above, in the learning by the inspection device, image data of the non-defective product and image data of the defective product are used. In order to improve inspection accuracy, many pieces of image data are necessary for both the non-defective product and the defective product. However, in a manufacturing site of industrial products and the like, in general, the products are manufactured to produce defective products as few as possible, and thus, there are a lot of non-defective products, whereas there are a very few defective products. For this reason, it is more difficult to collect the image data of the defective product (hereinafter, referred to as "defective product data") than the image data of the non-defective product (hereinafter, referred to as "non-defective product data"), which is relatively easily collectable.

In addition, in collecting the defective product data, it is necessary to perform an operation called annotation for associating information, such as a type of a defect included in an image or a position coordinate where a defect is present, with each piece of defective product data. In a case where many pieces of defective product data are prepared as teacher data for learning by the classification model, it is necessary to perform an annotation operation for an enormous amount beforehand. Hence, there is a demand for a method for automatically and accurately giving these annotations.

For such an issue, there is a known technique of generating many pieces of pseudo defective product data by using a generation model and a classification model that have been caused to perform learning by using defective product data, also giving an annotation, and utilizing such data as teacher data. For example, in JP 2020-60879 A, learning of a generator and an estimator is performed beforehand by use of defect images for the learning, and the estimator estimates a type and a position of a defect for the defect image that has been generated by the generator, and many pieces of annotated teacher data are generated.

SUMMARY

In the teacher data generating method in JP 2020-60879 A, however, an annotation for the defect image, that is, an association between the defect image and the type of the defect and the position of the defect is conducted by a classification model of the estimator. Hence, the accuracy in the annotation depends on the accuracy of the classification model. For this reason, in a case where the accuracy of the classification model is insufficient, there is a drawback that the accuracy of the annotation is also degraded. Further, it is necessary to construct the classification model for the annotation, and the cost also increases.

The present invention has been made to address the above drawbacks, and has an object to provide a teacher data generating method capable of generating many pieces of teacher data at a low cost, to each of which an annotation with high accuracy has been given, based on a few pieces of defective product data.

In order to achieve the above object, according to a first aspect of the present invention, a teacher data generating method includes: causing a generation model to perform learning by using, as training data, a learning image in which boundary information indicating in a chromatic color a range of a defect in a defective product image is superimposed on the defective product image in a gray scale so as to generate a generated defect image including a new image of a defect in the gray scale and an image of the boundary information in the chromatic color indicating a range of the defect (step 1 of FIG. 3); generating the generated defect image by using the generation model that has performed the learning (step 2 of FIG. 3); extracting a pixel having a pixel value corresponding to the chromatic color from the generated defect image that has been generated, extracting the boundary information corresponding to the generated defect image, and acquiring a gray scale defect image without including an image of the boundary information (steps 3 to 5 of FIG. 3); calculating, as a boundary coordinate, a coordinate of the boundary information that has been extracted in the generated defect image (step 6 of FIG. 3); and associating the gray scale defect image with the boundary coordinate that has been calculated to obtain defective product teacher data (step 7 of FIG. 3).

In such a teacher data generating method, learning of the generation model is performed by use of a learning image obtained by superimposing the boundary information indicating the range of the defect in the defective product image in a chromatic color on a gray scale defective product image and synthesizing them beforehand. Accordingly, the generation model is capable of generating a generated defect image including a new image of a defect that can occur and an image of the boundary information in a chromatic color arranged to indicate a range of the defect.

Then, by extracting a pixel having a pixel value of the chromatic color from such a generated defect image, the boundary information indicating the position of the defect in the generated defect image is extracted, and in addition, a gray scale defect image from which the image of the boundary information has been removed is acquired. After the boundary information is extracted, the coordinate of the boundary information in the generated defect image is calculated, the coordinate that has been calculated is associated with the acquired gray scale defect image, and thus the annotated defective product teacher data can be created.

In this manner, in such a teacher data generating method, the boundary information indicating the range of the defect is embedded as an image beforehand. The generated defect image is generated, based on the image in which the boundary information is embedded, and then the boundary information is extracted, based on the color of the image. The boundary information obtained in this manner always indicates the range of the defect accurately. Therefore, by associating the boundary information with the gray scale defect image, it becomes possible to give an annotation with accuracy in a simple process. In addition, it is not necessary to construct a classification model for the annotation, and the cost of the annotation can be reduced. Therefore, by repeatedly performing such a teacher data generating method, it is possible to generate many pieces of teacher data to each of which the annotation with high accuracy has been given at a low cost, based on a few pieces of defective product data.

According to a second aspect of the present invention, in the teacher data generating method described in the first aspect, the boundary information includes a bounding box in the chromatic color, and in the calculating, a coordinate of each vertex of the bounding box is calculated as the boundary coordinate.

According to this configuration, the boundary information includes the bounding box in a chromatic color. Therefore, in a simple process of calculating the coordinate of each vertex of the bounding box having a rectangular shape that has been extracted from the generated defect image, and associating the coordinate with the gray scale defect image, the annotated defective product teacher data can be created. Therefore, by repeatedly performing such a teacher data generating method, it is possible to generate many pieces of teacher data to each of which the annotation with high accuracy has been given at a lower cost, based on a few pieces of defective product data.

According to a third aspect of the present invention, a teacher data generating device includes: a preliminary learning unit (preliminary learning unit 12) configured to cause a generation model to perform learning by using, as teacher data, a learning image in which boundary information indicating in a chromatic color a range of a defect in a defective product image is superimposed on the defective product image in a gray scale so as to generate a generated defect image including a new image of a defect in the gray scale and an image of the boundary information in the chromatic color indicating a range of the defect; a defect image generation unit (defect image generation unit 13) configured to generate the generated defect image by using the generation model that has performed the learning; a boundary information extraction unit (boundary information extraction unit 14) configured to extract a pixel having a pixel value corresponding to the chromatic color from the generated defect image that has been generated, to extract the boundary information corresponding to the generated defect image, and to acquire a gray scale defect image without including an image of the boundary information; a boundary coordinate calculation unit (boundary coordinate calculation unit 15) configured to calculate, as a boundary coordinate, a coordinate of the boundary information that has been extracted in the generated defect image; and a defective product teacher data creation unit (defective product teacher data creation unit 16) configured to associate the gray scale defect image with the boundary coordinate that has been calculated to obtain defective product teacher data.

In such a teacher data generating device, learning of the generation model is performed by the preliminary learning unit by use of a learning image obtained by superimposing the boundary information indicating the range of the defect in the defective product image in a chromatic color on a gray scale defective product image and synthesizing them beforehand. Accordingly, by using the generation model, the defect image generation unit is capable of generating a generated defect image including a new image of a defect that can occur and an image of the boundary information in a chromatic color arranged to indicate a range of the defect.

Then, the boundary information extraction unit extracts a pixel having a pixel value of a chromatic color from the generated defect image, extracts the boundary information indicating the position of the defect in the generated defect image, and also acquires a gray scale defect image from which the image of the boundary information has been removed. Then, the boundary coordinate calculation unit calculates the coordinate of the boundary information in the generated defect image, the defective product teacher data creation unit associates the coordinate that has been calculated with the acquired gray scale defect image, and is capable of creating annotated defective product teacher data. Therefore, by repeatedly using such a teacher data generating device, it is possible to generate many pieces of teacher data to each of which the annotation with high accuracy has been given at a low cost, based on a few pieces of defective product data.

BRIEF DESCRIPTION OF DRAWINGS

FIG. 4 is a diagram for describing generation of a generated defect image by the teacher data generating device; and FIG. 5 is a diagram for describing generation of defective product teacher data by the teacher data generating device.

DETAILED DESCRIPTION

Figure 1:
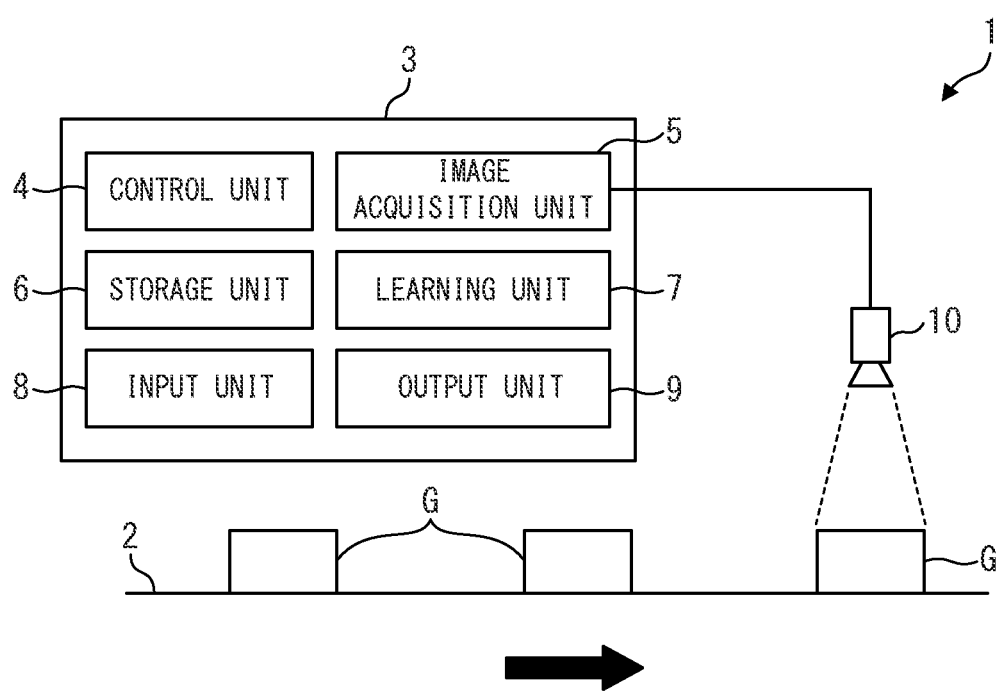
FIG. 1 is a diagram for describing an outline of an inspection system in which defective product teacher data that has been generated by a teacher data generating device according to an embodiment of the present invention is used for learning.

Hereinafter, preferred embodiments of the present invention will be described in detail with reference to the drawings. FIG. 1 illustrates an inspection system including a classification model that has been learned by use of data (defective product data) of a large number of defective product images (defective product data) that have been generated by a teacher data generating device 11 to be described later and data of a large number of non-defective product images (non-defective product data). Such an inspection system 1 is installed in, for example, a manufacturing factory of vehicle components, and by inspecting an appearance of a vehicle component, automatically determines whether a manufactured vehicle component (for example, a cylinder block) is a normal product (non-defective product) or an abnormal product (defective product). Hereinafter, a vehicle component to be inspected will be referred to as an "inspected object".

As illustrated in FIG. 1, the inspection system 1 includes a conveyor 2 for conveying an inspected object Gin a predetermined direction at a predetermined speed, and an inspection device 3 for determining the quality of the inspected object G, when the inspected object G reaches a predetermined inspection position. Note that the illustration is omitted, but the inspected object G that has been determined as a defective product by the inspection device 3 is removed from the conveyor 2, or is conveyed to a storage place dedicated to the defective products.

The inspection device 3 is configured with an information processing device mainly including a computer, and includes a control unit 4, an image acquisition unit 5, a storage unit 6, a learning unit 7, an input unit 8, an output unit 9, and a camera 10.

The control unit 4 includes a CPU, and controls the above respective units 5 to 9 of the inspection device 3, and the camera 10. The image acquisition unit 5 acquires, as digital data, an external appearance image of the inspected object G that has been imaged by the camera 10. The storage unit 6 includes a ROM and a RAM, stores various programs to be used in the control of the inspection device 3, and also stores various types of data. The learning unit 7 includes a learning model by which criteria for determining the quality of the inspected object G have been learned. The input unit 8 includes a keyboard and/or a mouse to be operated by an operator, and in addition, is configured so that data and/or signals can be input from the outside. The output unit 9 includes a display device such as a display on which a determination result of the inspected object G is displayed.

Figure 2:
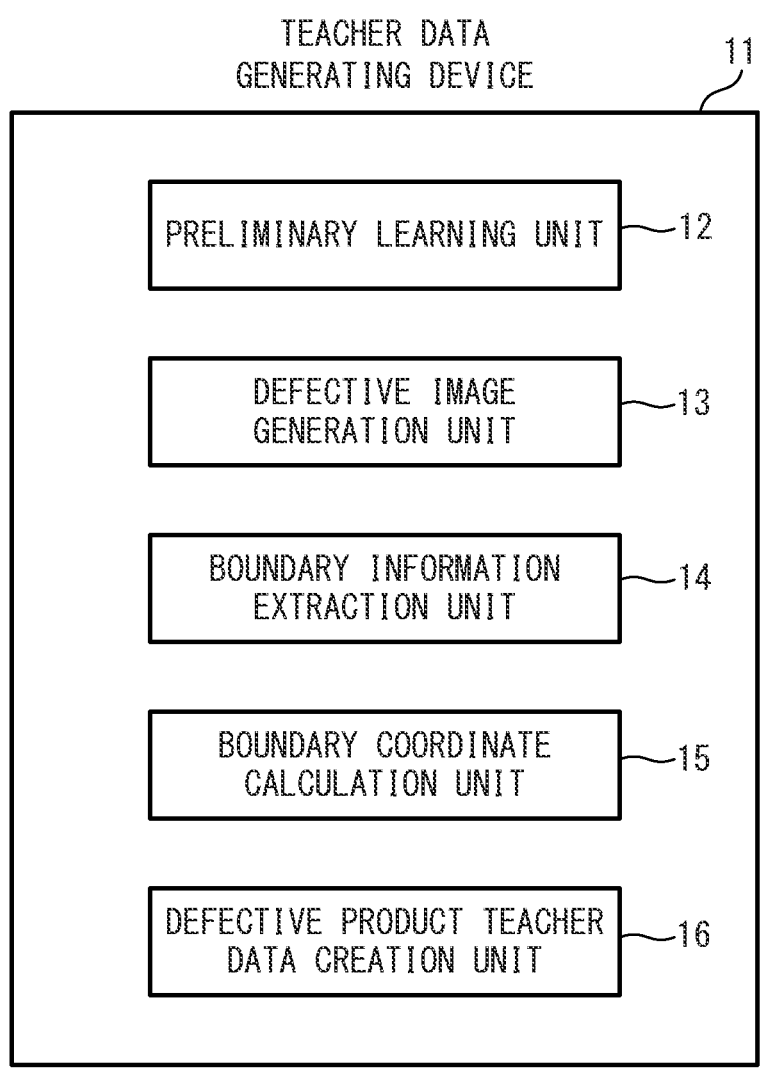
FIG. 2 is a block diagram illustrating the teacher data generating device according to an embodiment of the present invention.

FIG. 2 illustrates a teacher data generating device 11 according to an embodiment of the present invention. The teacher data generating device 11 is operated by an operator who performs an inspection operation of the inspected object G for a purpose of generating defective product teacher data. Similarly to the inspection device 3 described above, the teacher data generating device 11 is configured with an information processing device including a computer, and includes a preliminary learning unit 12 (preliminary learning unit), a defect image generation unit 13 (defect image generation unit), a boundary information extraction unit 14 (boundary information extraction unit), a boundary coordinate calculation unit 15 (boundary coordinate calculation unit), and a defective product teacher data creation unit 16 (defective product teacher data creation unit).

The preliminary learning unit 12 performs learning of a generation model included in the defect image generation unit 13 to be described later, using learning images obtained by superimposing the boundary information indicating a range of a defect in a chromatic color in a defective product image on a defective product image in a gray scale and synthesizing them (preliminary learning step). The learning image is prepared beforehand as training data to be used for learning of the generation model. For example, for a defective product image in a gray scale that has been imaged on a manufacturing line, an operator manually performs the annotation operation to apply a label of class information C indicating a type of a defect and boundary information in a chromatic color indicating the range of the defect, and creates the learning image as one piece of image data.

As the generation model, a variational auto encoder (VAE), a generative adversarial network (GAN), or the like can be used. When the above-described learning image, that is, the data obtained by imaging the defect represented in a gray scale and the boundary information in a chromatic color indicating its range are given as inputs, the generation model learns a latent variable z so as to output an image approximate to the learning image.

The class information C indicating the type of any defect and a predetermined parameter value in the latent variable z are given as inputs into the generation model that has performed learning, and thus the defect image generation unit 13 generates a generated defect image including a new image of a defect that can occur and an image of the boundary information in a chromatic color to be arranged to indicate a range in which the defect is present (defect image generating step).

The boundary information extraction unit 14 scans each pixel that constitutes the generated defect image that has been generated, extracts pixels having pixel values close to a color of the boundary information in the learning image, and thus extracts the pixels as the boundary information indicating the position of the defect in the generated defect image (boundary information extracting step). In addition, the generated defect image after the pixels corresponding to the boundary information have been extracted is stored as a gray scale defect image, in a storage unit, not illustrated. The storage unit may be provided as a part of the teacher data generating device 11, or may be provided outside the teacher data generating device 11. In addition, in the gray scale defect image, regarding a part from which the pixels are extracted when the boundary information is extracted, a process of replicating information of the pixel in close proximity to such a part to supplement such a part may be performed.

The boundary coordinate calculation unit 15 calculates coordinates of the boundary information that has been extracted, in the generated defect image (boundary coordinate calculating step).

The defective product teacher data creation unit 16 stores the coordinates of the boundary information that have been calculated and the class information C that has been input, in the storage unit (not illustrated), in association with the gray scale defect image that has been acquired, and thus creates annotated defective product teacher data to which the information about the type and the position of the defect is applied.

Figure 3:
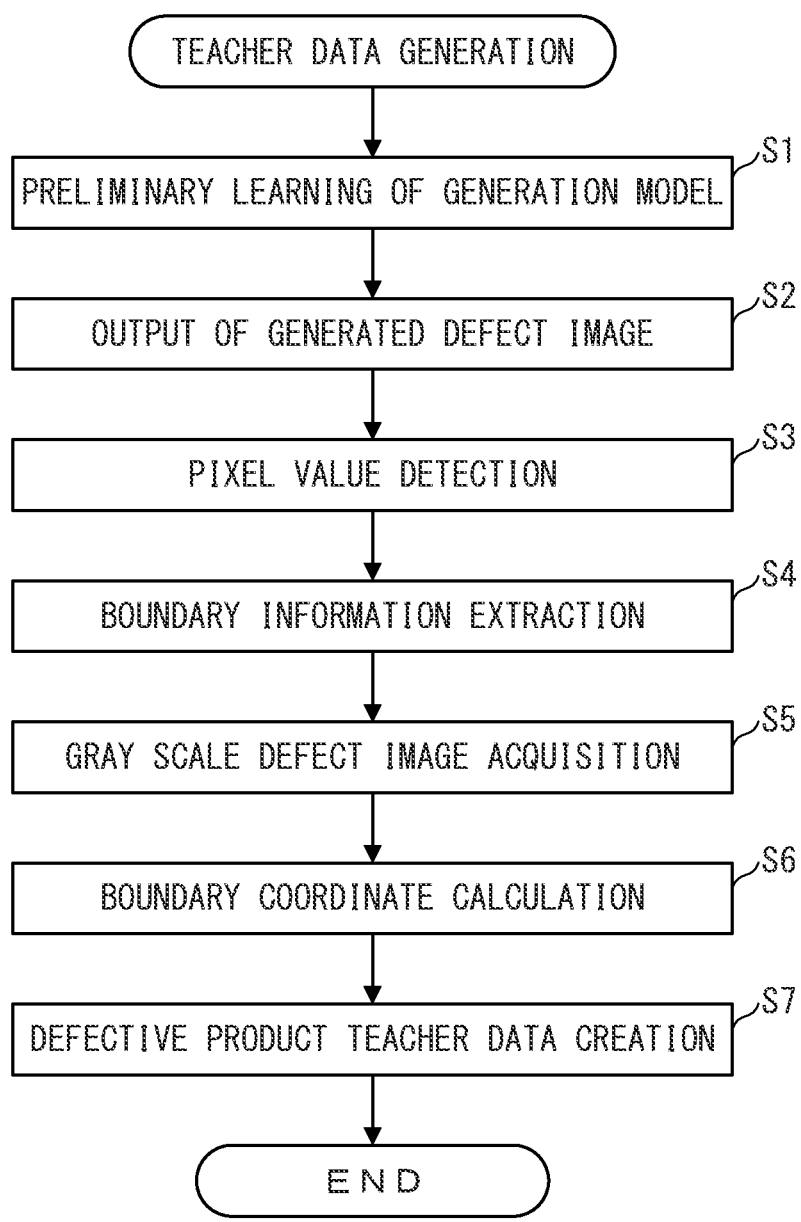
FIG. 3 is a flowchart illustrating generation processing of defective product teacher data by the teacher data generating device.

FIG. 3 illustrates generation processing of defective product teacher data by the teacher data generating device 11 described above. In the present processing, first, in step 1 (indicated as "S1" in the drawing. Hereinafter, the same will apply), the preliminary learning of the generation model is performed. In the preliminary learning, learning of a generation model that uses a neural network such as the VAE or the GAN is performed by use of the above-described learning images as the training data. Note that as described above, the learning image denotes one piece of image data in which the class information C and the boundary information are applied to a defective product image in a gray scale. In the learning, a plurality of pieces of learning images respectively including various defect shapes, the class information C, and the boundary information are used as the training data. When the learning image is given as an input, the generation model learns the latent variable z by optimizing the neural network so as to output a generated image approximate to the learning image.

Note that in the present embodiment, a red bounding box is used as the boundary information. Therefore, in the learning image, an image of the red bounding box having a rectangular shape is arranged to surround the position of a defect in the defective product image.

Next, by use of the generation model that has performed learning, a defect image that has been generated, that is, a generated defect image is output (step 2). FIG. 4 illustrates an outline of generation of the generated defect image by the teacher data generating device 11 in the present embodiment. As illustrated in FIG. 4, any class information C and a predetermined parameter value in the latent variable z are input into the generation model that has performed learning, and thus generated defect images respectively including images of various defects that can occur and images, in each of which a red bounding box is arranged to surround a position where the defect is present, are generated.

Next, each pixel that constitutes the generated defect image that has been output is scanned, and a pixel value close to the color used in the bounding box is detected (step 3). The bounding box in the present embodiment is red. Therefore, it can be set such that a pixel having values similar to, for example, 255:0:0 in the respective values of RGB is detected. The defect and the background in the image are represented in a gray scale, and thus the pixels indicating the defect or the background are not detected. Accordingly, it is possible to detect pixels of the rectangular shape corresponding to the image of the bounding box. Next, the detected pixels are extracted, and the extracted pixels are extracted as the bounding box indicating the position of the defect in the generated defect image (step 4).

In addition, the generated defect image, from which the pixels corresponding to the bounding box are extracted, is acquired as a gray scale defect image including only the defect image in a gray scale, and is stored in a storage unit, not illustrated (step 5). Note that in the gray scale defect image, it may be configured that a part from which the pixels are extracted in the extraction of the bounding box is subject to a process of replicating information of the pixel in close proximity to such a part to supplement such a part. In this case, the pixels to be replicated are assumed to be pixels representing the background in which no defect is present around the defect.

Next, coordinates of the extracted bounding box in the generated defect image are calculated (step 6). In the present embodiment, by calculating a minimum value (Xmin) and a maximum value (Xmax) on a horizontal axis (X axis) and a minimum value (Ymin) and a maximum value (Ymax) on a vertical axis (Y axis), it becomes possible to calculate the coordinates of the respective vertexes of the bounding box having a rectangular shape.

Next, information of the calculated coordinates of the bounding box and the class information C that has been input when the generated defect image is generated are stored in the storage unit, not illustrated, in association with the acquired gray scale defect image (step 7). Accordingly, the annotated defective product teacher data, to which the information about the type of the defect and the position of the defect are applied, is obtained.

FIG. 5 illustrates an outline of generation of the defective product teacher data by the teacher data generating device 11 according to the present embodiment. As described above, in the present embodiment, the image in which the defect and the bounding box arranged to surround the defect are integrated is generated as the generated defect image. Therefore, in the generated defect image, the position of the image of the bounding box always accurately surrounds a range in which the image of the defect is present. Then, the pixels corresponding to the image of the bounding box are extracted from such a generated defect image, and are used as the bounding box itself indicating the range of the defect in the generated defect image. Therefore, the annotation can be accurately given in a simple process. In addition, according to the present embodiment, it is not necessary to construct a classification model for annotation, the cost can be reduced.

Therefore, by repeatedly using the teacher data generating device 11 in the present embodiment to generate the defective product teacher data from various types of different generated defect images, it is possible to generate many pieces of defective product teacher data to each of which an annotation with high accuracy has been given at a low cost, based on a few pieces of defective product data.

Note that the present invention is not limited to the above-described embodiments, and can be implemented in various modes. For example, in the above described embodiment, it is configured to use actual defective product data that has been imaged on the manufacturing line, as the gray scale defective product image for creating the learning image. However, it may be configured to use pseudo defective product data that has been generated by use of, for example, the VAE or the GAN, based on the actual defective product data. In addition, the detailed configuration of the teacher data generating device 11 described in the embodiments is merely an example, and can be appropriately changed within the scope of the gist of the present invention.

What is claimed is:

1. A teacher data generating method comprising:
    causing a generation model to perform learning by using, as training data, a learning image in which boundary information indicating in a chromatic color a range of a defect in a defective product image is superimposed on the defective product image in a gray scale so as to generate a generated defect image including a new image of a defect in the gray scale and an image of the boundary information in the chromatic color indicating a range of the defect;
    generating the generated defect image by using the generation model that has performed the learning;
    extracting a pixel having a pixel value corresponding to the chromatic color from the generated defect image that has been generated, extracting the boundary information corresponding to the generated defect image, and acquiring a gray scale defect image without including an image of the boundary information;
    calculating, as a boundary coordinate, a coordinate of the boundary information that has been extracted in the generated defect image; and
    associating the gray scale defect image with the boundary coordinate that has been calculated to obtain defective product teacher data.

2. The teacher data generating method according to claim 1, wherein the boundary information includes a bounding box in the chromatic color, and
    in the calculating, a coordinate of each vertex of the bounding box is calculated as the boundary coordinate.

3. A teacher data generating device comprising:
    a preliminary learning unit configured to cause a generation model to perform learning by using, as training data, a learning image in which boundary information indicating in a chromatic color a range of a defect in a defective product image is superimposed on the defective product image in a gray scale so as to generate a generated defect image including a new image of a defect in the gray scale and an image of the boundary information in the chromatic color indicating a range of the defect;
    a defect image generation unit configured to generate the generated defect image by using the generation model that has performed the learning;
    a boundary information extraction unit configured to extract a pixel having a pixel value corresponding to the chromatic color from the generated defect image that has been generated, to extract the boundary information corresponding to the generated defect image, and to acquire a gray scale defect image without including an image of the boundary information;

a boundary coordinate calculation unit configured to calculate, as a boundary coordinate, a coordinate of the boundary information that has been extracted in the generated defect image; and a defective product teacher data creation unit configured to associate the gray scale defect image with the boundary coordinate that has been calculated to obtain defective product teacher data.

* * * * *